United States Patent Office 2,755,369
Patented July 17, 1956

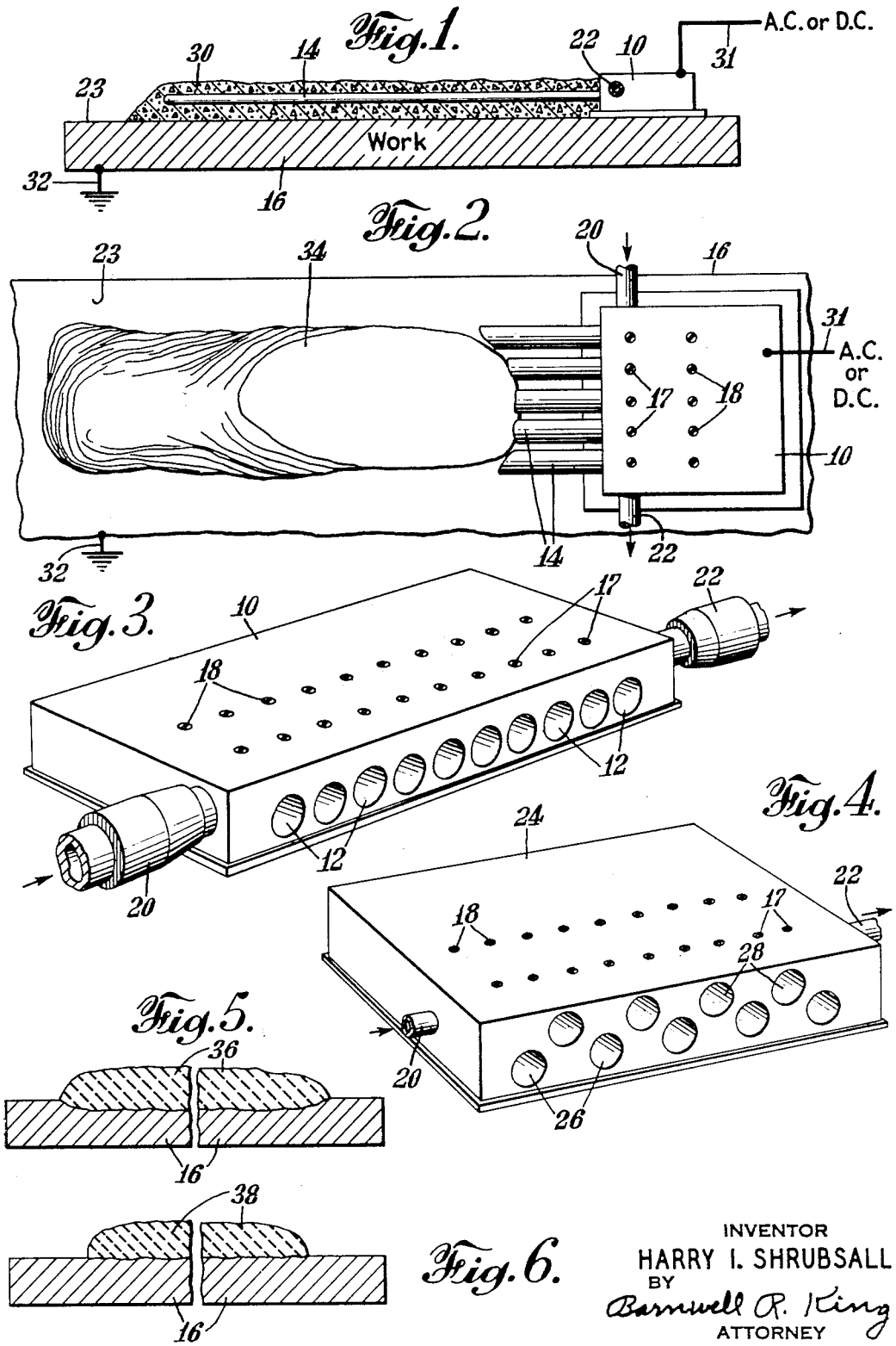

2,755,369

CLADDING BY SUBMERGED-MELT WELDING

Harry I. Shrubsall, Scotch Plains, N. J., assignor to Union Carbide and Carbon Corporation, a corporation of New York Application December 9, 1952, Serial No. 324,929

5 Claims. (Cl. 219—10)

This invention relates to cladding a base metal member with a layer of the same or different metal, and more particularly to cladding by submerged-melt electric welding of the type disclosed by the patent to Jones et al., No. 2,043,960.

In such welding it is customary to use a single welding electrode or bare rod that is fed longitudinally of itself toward the welding zone and moved lineally with respect to the work as the operation progresses. For cladding such welding requires many passes to cover a desired area on the surface of the base metal member with a layer of added metal, which takes considerable time and involves an undesirably high degree of penetration of the base metal by the added metal. Thus, metal veneering by such welding, though widely used, is rather costly since the cladding metal must be deposited in many adjacent, narrow beads. Attempts to increase the size of the bead result in an even greater depth of deposited metal and of penetration into the workpiece; neither effect being desirable, especially when veneering with scarce and expensive high-alloy metals.

The main object of this invention is to provide a novel submerged melt welding process which overcomes such difficulties.

The present invention overcomes these difficulties by employing a number of elongated electrodes (up to 10 have been used) laid in close, but spaced, parallel proximity to each other and to the surface of the workpiece. All of the electrodes are simultaneously connected at one end to one side of a suitable welding power supply circuit (A. C. or D. C.) and the work is connected to the other side of such circuit. It is not necessary to arrange the power circuit so that a separate arc is established at the end of each electrode; one arc will melt all of the electrodes, according to the procedure of this invention, by covering the electrodes with a granular, fusible welding composition. The deposited metal is wide and thin, depending upon the diameter and spacing of the electrodes, and dilution of the deposit by base metal is reduced to very low values.

The electrodes are held at one end in a novel insulated holder and positioned on a horizontal plane, with the electrodes parallel to one another and to the line of welding. An insulating medium is provided between the electrodes and the workpiece to prevent the electrodes from shorting to the workpiece. The welding action is started at the free end of the electrodes by any convenient method. Once the welding action has been started, however, it continues by itself until the welding power has been turned off.

In the drawings:

Fig. 1 is a view mainly in side elevation of a set-up illustrating the invention;

Fig. 2 is a top plan view of a weld deposit made according to the invention with the electrode holder in place and the flux removed;

Fig. 3 is a perspective view of one electrode holder illustrating the invention;

Fig. 4 is a similar view of a modified holder; and

Figs. 5 and 6 are cross-sectional views of welds made according to the invention with the holders shown in Figs. 3 and 4, respectively.

As shown in Figs. 1 and 3 the electrode holder 10 consists of a block of suitable metal such as copper having a single row of parallel sockets 12 for receiving the end portions of electrodes 14 in the form of elongated rods composed of the metal to be added to a base metal member or workpiece 16. Such electrode end portions are secured in place in the sockets 12 by set screws 17 and 18. The holder 10 is provided with passage means for conducting cooling liquid such as water between inlet and outlet nipples 20, 22 to keep the holder 10 from over-heating during the welding process. The sockets 12 are arranged in a straight row and spaced to maintain a gap of about 1/8-inch, for example, in the case of 3/8-inch diameter electrodes between the free portions of individual electrodes and between the such portions of the electrodes and the top surface 23 of the workpiece 16. However, a reasonable variation in spacing between the electrodes is allowable with the technique of the invention. The degree of such variation, in general, should increase as the current employed is increased.

In order to minimize dilution I have discovered that a modified holder 24, shown in Fig. 4, is unexpectedly superior. Such holder is provided with sockets 26, 28 arranged to hold the electrodes in staggered relation rather than in a single straight row. The sockets 26 of the first, or bottom, row are positioned so as to maintain a 1/8-inch gap between the electrodes and the workpiece. The sockets 28 of the second, or top, row are positioned similarly above the first row in staggered relation thereto with a gap of about 3/8-inch between the top row of electrodes and the top surface of the workpiece.

The holder is placed on an insulating plate on the workpiece 16 and the free portions of the electrodes 14 are covered with a layer or blanket of granular submerged-melt welding composition 30 which rests on the top of the workpiece. The holder and the workpiece are connected to a suitable source of D. C. or A. C. welding current such as a 1000-ampere transformer by conventional circuit means including a work lead 31 and a ground lead 32 to supply the necessary welding power. The welding action is initiated by any convenient method, such as steel wool, carbon chips, high-frequency, or by momentarily short-circuiting the free end of any one of such electrodes to the workpiece, and such action proceeds without interruption toward the holder until the welding current circuit is opened.

The maximum current that can be used for welding according to the invention is determined by the following factors: (1) Diameter of the electrodes; (2) length of the electrodes; and (3) number of electrodes. The welding speed for a given weld length is governed by factors 1 and 3, and also by the value of the welding current employed. The weld width is determined by the overall width of the electrode assembly.

The values of the welding current employed in actual tests of the invention ranged from 700 to 1900 amperes, depending on the diameters, lengths, and quantity of the electrodes used.

Deposits of the surface build-up type were made on 1/2-inch thick tank quality steel, using "Oxweld" No. 36 rod (Linde) and Grade 80 "Unionmelt" (Linde) welding composition. However, other types of electrode composition and "Unionmelt" compositions may be used in addition to those listed above. For instance, electrodes composed of heat-resistant and corrosion-resistant alloys and also of wear-resistant alloys may be employed, as well as non-ferrous materials.

Data obtained from cross sections of welds made with holder 10 using from three to ten electrodes (5/16- or 3/8- inch diameter) and ⅛-inch air gap showed dilution values from 25% to 35%. However, cross sections taken from weld deposits made with the modified electrode holder 24 showed extremely low penetration and dilution.

It is desirable that the welding electrodes be substantially straight in order to maintain the necessary spacing between the electrodes and the workpiece to prevent shorting. As shown in Fig. 1, the gap between the electrodes and base plate eliminates the use of an insulating medium, except when the electrodes are crooked, or long enough to bend under their own weight.

For relatively long lengths of electrodes, small slivers of wood, such as match sticks, may be inserted between the electrodes and the workpiece. This technique was used satisfactorily on welds 34 inches long made according to the invention. Due to the large molten weld puddle, the solidification period of the weld metal is long enough to liberate the gases formed by the burning of the wood inserts. Such spacing can also be maintained by means of easily fusible materials such as ceramic or glass plates or sleeves placed between or around the electrodes. The latter have the advantage of providing an insulating means not only between adjacent electrodes but also between the electrodes and the base metal workpiece.

It was thought that by placing a layer of granular submerged-melt welding composition or melt on the workpiece (before positioning the electrodes), it would be sufficient to maintain a uniform space between the electrodes and the workpiece. However, due to slight vibrations in the electrodes, caused by the welding action, one or more of the electrodes would settle through the prelaid granular submerged-melt welding flux or melt and short circuit.

A typical weld deposit was made according to the invention with four ⁵⁄₁₆-inch diameter electrodes at a welding current of 1000-amperes and a potential of 40–45 volts, the welding speed being 8 inches per minute. The electrode deposition was 0.63 pound per minute, and the metal consumption was 1.66 pounds per minute.

Another was made with four ⅜-inch diameter electrodes and similar welding conditions. The weld speed was 5.8 inches per minute. The electrode deposition was 0.70 pound per minute, and the melt consumption 0.96 pound per minute.

A third weld 34, Fig. 2, was made with five ⅜-inch diameter electrodes 14 at a welding current of 1275 amperes and a potential 35 to 40 volts, the welding speed being 5.5 inches per minute. The electrode deposition was 0.80 pound per minute, and the melt consumption was 0.96 pound per minute.

A fourth weld was made with six ⁵⁄₁₆-inch diameter electrodes at a welding speed of 6.5 inches per minute. The welding circuit conditions were 1150 amperes and 40 to 45 volts. The electrode deposition was 0.80 pound per minute, and the melt consumption 1.70 pounds per minute.

A typical weld 36 is shown in section in Fig. 5. This weld was made according to the invention with ten ⅜-inch diameter electrodes using 1600-amperes and 35 volts, at a welding speed of 3½ inches per minute. The electrode deposition was 1.04 pounds per minute, and the melt consumption was 1.53 pounds per minute. The dilution value of this weld was 23%.

A cross section of a weld 38 made using the staggered electrode technique of the invention is shown in Fig. 6. Extremely small penetration and dilution values are attained by this technique. The values are so small that they can not be accurately measured, but it is estimated that the dilution was less than 5% and the depth of penetration approximately ¹⁄₃₂-inch. Thus, this type of welding is suitable for hard-facing and surfacing applications not feasible by any prior known process.

The weld 38 shown in Fig. 6 (using the holder 24 shown in Fig. 4) was made with nine ⅜-inch diameter electrode using a 1000-ampere current at 44 volts, and a welding speed of 3.7 inches per minute. The electrode deposition was 0.70 pound per minute, and the melt consumption was 1.85 pounds per minute.

I claim:

1. Cladding by submerged-melt electric welding which comprises arranging in spaced side-by-side relation a plurality of relatively straight elongated electrodes composed of the cladding metal, substantially uniformly spaced above the flat top surface of a base metal member, insulating common end portions of such electrodes from each other and from said member, covering such common end portions of the electrodes and the adjacent surface of the base metal member with a blanket of granular submerged-melt welding flux, connecting all of the opposite end portions of such electrodes in a parallel circuit, connecting said parallel circuit and said member in series circuit relation with a common source of welding current, striking a single arc between at least one of the so covered electrode ends and the base metal member, fusing with such single arc all of the so covered ends of such electrodes, the adjacent base metal surface and flux, leaving the fused electrode metal deposited on and cladded to the surface of such base metal member in a common layer of weld metal.

2. Cladding as defined by claim 1, in which the electrically connected common end portions of electrodes and the base metal member are relatively stationary during the entire welding cycle.

3. Cladding by submerged-melt electric welding which comprises securing a plurality of bare metal welding rods of the cladding metal at one end in a common holder comprising means for conducting current to said electrodes at such end, with such rods arranged in spaced parallel relation with respect to one another and the upper level surface of a base metal member, insulating the free end portions of said rods from one another and from said base metal member, covering such rod portions with granular submerged-melt welding flux, connecting such holder and said member in circuit with a welding current source, striking a single arc under such flux between the free end of at least one of such rods and the adjacent surface of said member, fusing the adjacent flux, whereupon such single arc travels automatically from the end of one electrode to another, fusing the ends of the electrodes uniformly and progressively toward such holder which remains stationary during such fusion, and discontinuing such fusion of the ends of the rods before it reaches said holder.

4. Cladding as defined by claim 3, in which ⁵⁄₁₆–⅜-inch diameter electrodes are arranged in at least one row at a uniform elevation of about ⅛-inch from such surface of the base metal member.

5. Cladding as defined by claim 3, in which ⁵⁄₁₆–⅜-inch diameter electrodes are arranged in two rows of alternate electrodes at different uniform elevations of about ⅛-inch and ⅜-inch, respectively, from such surface of the base metal member, for the purpose of minimizing dilution of the latter.

References Cited in the file of this patent

UNITED STATES PATENTS

| | | |
|---|---|---|
| 809,842 | Price et al. | Jan. 9, 1906 |
| 1,524,714 | Kjehstad | Feb. 3, 1925 |
| 1,552,349 | Ryan | Sept. 1, 1925 |
| 2,044,058 | Bustamante | June 16, 1936 |
| 2,306,050 | Frischmann | Dec. 22, 1942 |
| 2,631,214 | Kinkead | Mar. 10, 1953 |

FOREIGN PATENTS

| | | |
|---|---|---|
| 70,976 | Norway | Sept. 9, 1946 |